United States Patent
Farb

(10) Patent No.: US 8,814,515 B2
(45) Date of Patent: Aug. 26, 2014

(54) PLACING WATER TURBINES IN WATER FLOWS

(76) Inventor: Daniel Farb, Beit Shemesh (IL)

( * ) Notice: Subject to any disclaimer, the term of this patent is extended or adjusted under 35 U.S.C. 154(b) by 587 days.

(21) Appl. No.: 12/811,098

(22) PCT Filed: Nov. 30, 2008

(86) PCT No.: PCT/IB2008/055017
§ 371 (c)(1),
(2), (4) Date: Jun. 29, 2010

(87) PCT Pub. No.: WO2009/087505
PCT Pub. Date: Jul. 16, 2009

(65) Prior Publication Data
US 2010/0284784 A1    Nov. 11, 2010

Related U.S. Application Data

(60) Provisional application No. 61/017,816, filed on Dec. 31, 2007, provisional application No. 61/089,914, filed on Aug. 19, 2008.

(51) Int. Cl.
*F03B 7/00* (2006.01)
*F03B 13/08* (2006.01)
*F03B 15/00* (2006.01)

(52) U.S. Cl.
CPC ............ *F03B 13/08* (2013.01); *Y02E 10/226* (2013.01); *Y02E 10/22* (2013.01); *Y02E 10/38* (2013.01); *F03B 15/00* (2013.01); *F05B 2240/915* (2013.01)
USPC ................. 416/85; 415/7; 416/244 B; 290/53

(58) Field of Classification Search
CPC ........................................................ F03B 3/04
USPC .............. 415/2.1, 3.1, 4.3, 4.5, 7, 121.2, 143, 415/906, 908; 416/85, 170 R, 175, 189, 416/198 A, 244 B, 247 A, DIG. 4, DIG. 6; 290/42, 43, 53, 54
See application file for complete search history.

(56) References Cited

U.S. PATENT DOCUMENTS

| | | | | |
|---|---|---|---|---|
| 3,904,323 A | * | 9/1975 | Martin et al. | 417/334 |
| 3,983,404 A | * | 9/1976 | Sherrard | 290/53 |
| 4,014,173 A | * | 3/1977 | Keeling | 405/78 |

(Continued)

FOREIGN PATENT DOCUMENTS

| | | | |
|---|---|---|---|
| JP | 56-60863 | * | 5/1981 |
| JP | 56138462 | * | 10/1981 |
| WO | WO03/016710 A1 | * | 2/2003 |

OTHER PUBLICATIONS

Watabe et al., Pumping-up Power Accumulation System, Oct. 29, 1981, Abstract of JP 56138462.*

(Continued)

*Primary Examiner* — Ned Landrum
*Assistant Examiner* — Liam McDowell
(74) *Attorney, Agent, or Firm* — Mark M. Friedman

(57) ABSTRACT

A floating turbine, including a vertical substantially fixed structure such as a pile or cable, a hydroelectric turbine, a connecting piece between the turbine and the structure that is operative to enable vertical motion of the turbine on the surface of the water.

4 Claims, 5 Drawing Sheets

(56) References Cited

U.S. PATENT DOCUMENTS

| | | | |
|---|---|---|---|
| 4,053,787 A * | 10/1977 | Diggs | 290/54 |
| 4,172,689 A * | 10/1979 | Thorsheim | 415/7 |
| 4,272,685 A * | 6/1981 | Toyama | 290/52 |
| 4,307,299 A * | 12/1981 | Norton | 290/52 |
| 4,327,297 A * | 4/1982 | Harrison | 290/53 |
| 4,998,846 A * | 3/1991 | Evstratov et al. | 405/78 |
| 5,946,909 A * | 9/1999 | Szpur | 60/398 |
| 6,114,773 A * | 9/2000 | Kouris | 290/52 |
| 6,267,551 B1 * | 7/2001 | Dentinger | 415/3.1 |
| 6,559,554 B2 * | 5/2003 | Finley et al. | 290/54 |
| 6,568,181 B1 * | 5/2003 | Hassard et al. | 60/398 |
| 6,652,221 B1 * | 11/2003 | Praenkel | 415/3.1 |
| 7,190,088 B2 * | 3/2007 | Heidel | 290/54 |
| 2007/0292259 A1 * | 12/2007 | Choie | 415/8 |
| 2008/0106101 A1 * | 5/2008 | North et al. | 290/53 |

OTHER PUBLICATIONS

Fukuyo, Hydraulic Power Generator, May 26, 1981, Abstract of JP56-60863.*

* cited by examiner

Figure 1 Outfall System and Floating Turbine

Figure 2 Outflow System with Dam and Floating Turbine

Figure 4 Instream Benkatina 13 optional size adapter pieces to fit flow of stream
14 Benkatina Turbine
15 option of 2nd turbine, depending on flow
16 insertion into dirt of stream; clamps and ground screw; groove on pipe
17 plate for insertions

PLACING WATER TURBINES IN WATER FLOWS

RELATED APPLICATIONS

This patent application is a National Stage of PCT/IB2008/055017 filed on Nov. 30, 2008, which claims the benefit of U.S. Pat. No. 61/017,816, Hydro Turbines, Portable Wind, Waves and Magnets, filed Dec. 31, 2007; U.S. Pat. No. 61/089,914, Provisional 8-08: FDDs and Turbines, filed Aug. 19, 2008, the contents of which are incorporated herein by reference.

This patent application claims the benefit of 61/017,816, Hydro Turbines, Portable Wind, Waves, and Magnets, filed Dec. 31, 2007; 61/089,914, Provisional 8-08: FDDs and Turbines, filed Aug. 19, 2008.

FIELD AND BACKGROUND OF THE INVENTION

The present invention relates to providing hydroelectric power for water flows, including the use of an in-pipe turbine called a Benkatina Turbine. A Benkatina Turbine is an in-pipe turbine fitting inside a main and side chamber. It was previously described in terms of its overall shape in PCT application IL07/000770. This patent application describes novel applications of that turbine and other water turbines.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention relates to using Benkatina and other hydroelectric turbines in different bodies of water.

The principles and operation of a water system turbine according to the present invention may be better understood with reference to the drawings and the accompanying description.

Figure 1:
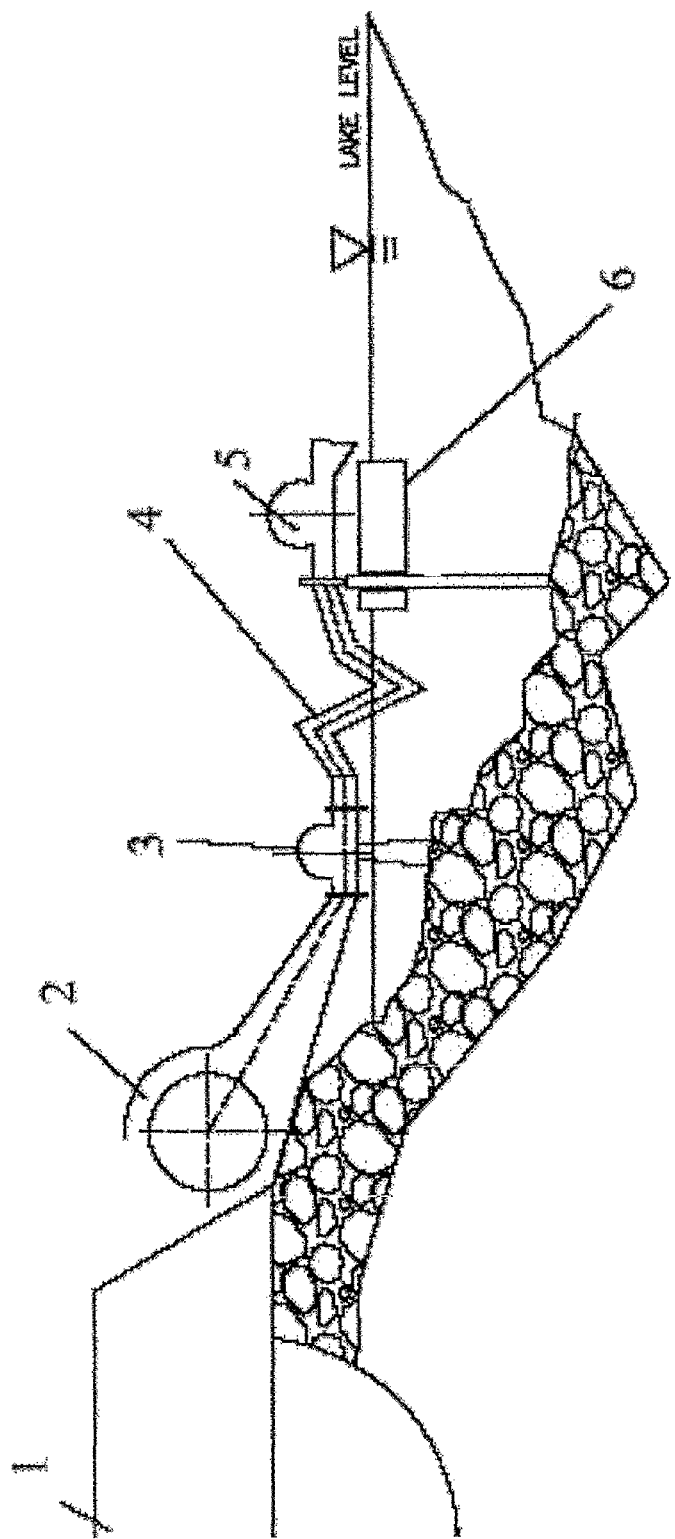
FIG. 1 is a diagram of an outfall system and floating turbine.
Figure 2:
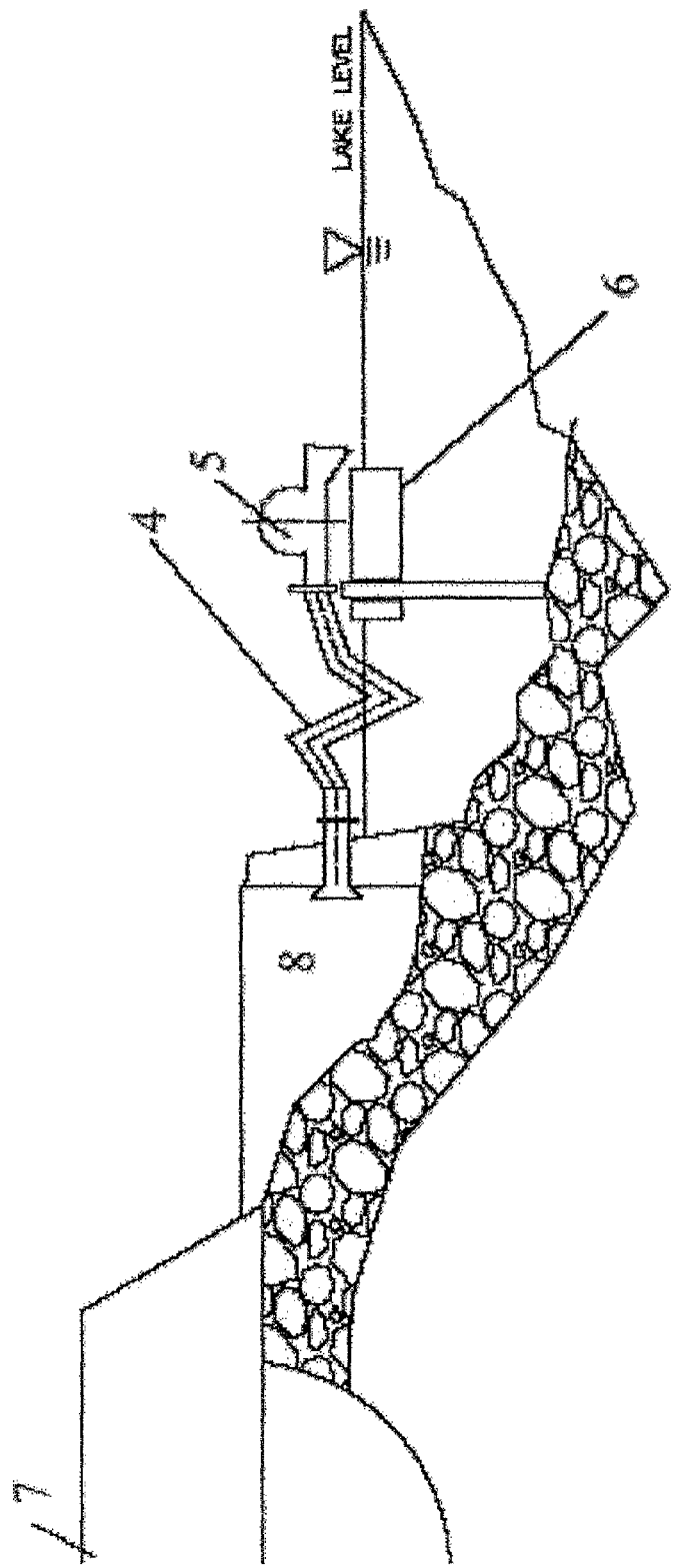
FIG. 2 is a diagram of an outfall system including a dam.

Many sites for turbines are located near a body of water. In particular, water treatment plants and carbon-burning plants may dump effluent water into a nearby body of water or even a piping system. FIGS. 1 and 2 show a system for obtaining energy from such a flow, or any similar flow.

Referring now to the drawings, FIG. 1 illustrates an outfall system and floating turbine. The outfall structure (1) releases water with some velocity whose kinetic energy is ideally captured by a turbine (2) located so that its blades contact the fluid below the outfall elevation. The purpose of turbine (2) is to take advantage of the velocity of the water emerging from the outfall without causing back-up into the outfall. That connects to a second turbine (3) whose operation is mostly from the head or pressure. Then there may be another turbine fixed to the land, or, if the system is near a body of water, a flexible hose (4) connects the outflow to a floating turbine (5) on a floating platform (6) with the outflow thereby always maintained above water level. Ideally the platform floats on a pile and has an indentation matching the shape of the pile, allowing it to move up and down on the pile with water level. The use of a floating platform is important in order to assure maximum power output in various tidal and other conditions of the receiving body of water.

FIG. 2 portrays a similar outfall structure (7) with a dam (8).

The first turbine in the sequence, and maybe additional ones, may use an option of little or no use of nozzles in order to take advantage of the velocity of flow without causing friction by concentrating it. Later stages can use nozzles. So one crucial point is the use of at least two turbines in sequence, wherein the second has more of a nozzle than the first. Another crucial point is the option of using, for at least the first turbine, in situations where the flow is not through a circular pipe such as an outfall, a cylindrically shaped pipe and turbine (oriented with the axis horizontal) so that the elevation is not lost by transferring the flow to a central nozzle. After the first turbine, at some point in the sequence, a dam or narrowing pipe is used. The first turbine is ideally similar to a water wheel.

Another novel point in those pictures is the use of a floating turbine at the end of the sequence that is attached by a hose to the fixed part of the system. This enables the system to operate on greater "head" during low tides or other occasions when the water level is lower. The pictures show the floating turbine on a fixed vertical structure, but there can be other methods and devices to carry this out. The main point is that the outlet should be as close to the surface as possible. The turbine on the flotation ideally has a means for attachment of another turbine, ideally at its end, so that it can be easily adapted to a lowering of the water level and an increase in the head available for energy.

That shows that with certain types of flow an in-stream turbine can be made with a wide and/or horizontal blade system to absorb the velocity.

FIG. 2 shows how a dam could be used in the second step of power extraction after the first turbine captures some velocity. Then the dam opens up through at least one turbine to the final outflow.

Figure 3:
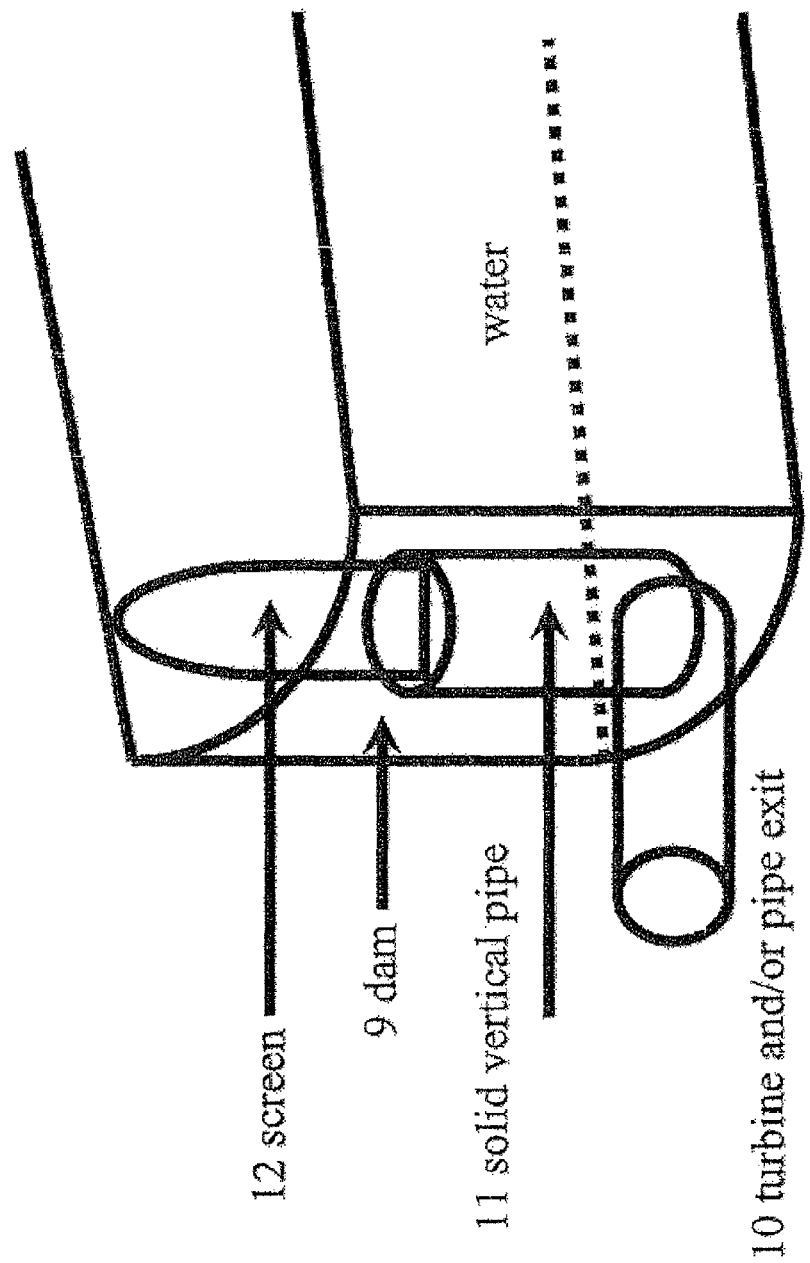
FIG. 3 is a diagram of a turbine entry system with a dam.

FIG. 3 shows one way in which a dam (9) can be used in association with a Benkatina Turbine (10) and, in other embodiments, other turbines, whose upper entry has a filter (12) with a screen on top of a vertical pipe (11) that allows water in above a certain level and is easy to clean off.

Figure 4:
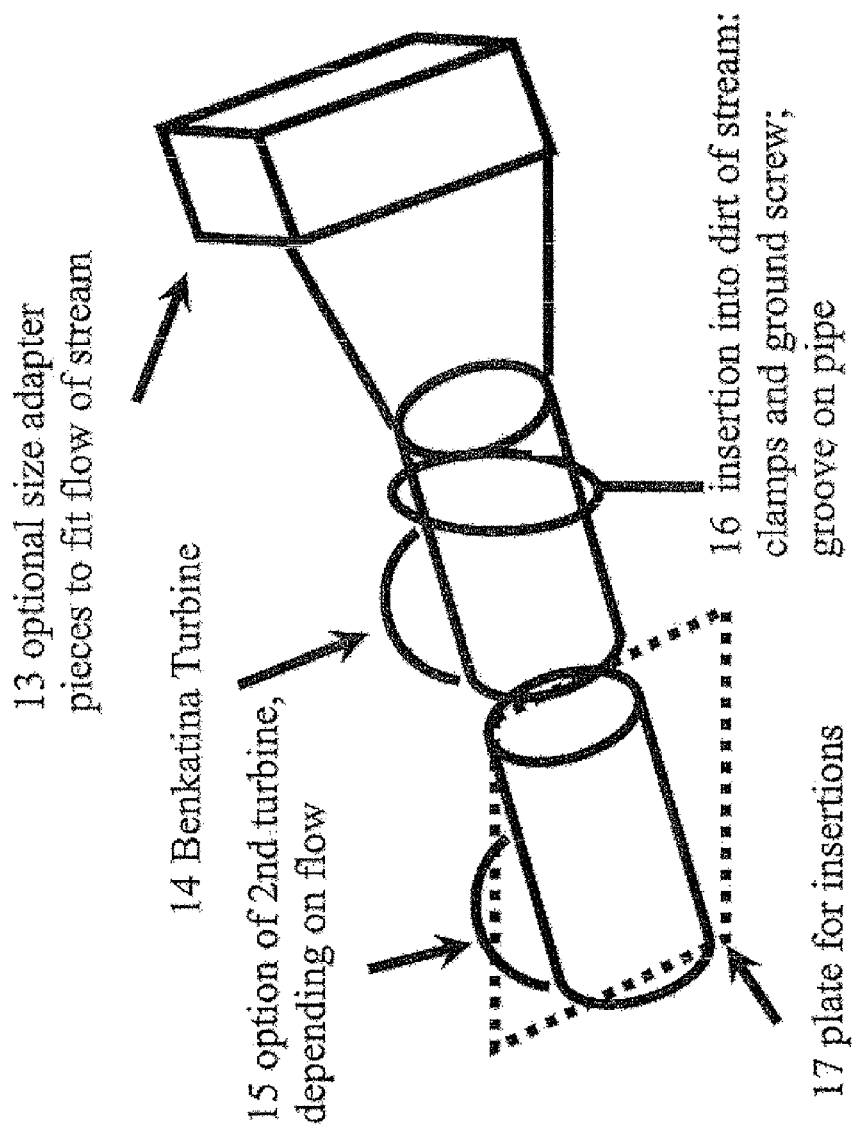
FIG. 4 is a diagram of an instream Benkatina turbine.

FIG. 4 shows a way to use a Benkatina (14) or any other in-pipe turbine in a small stream. At its upper end are adapter pieces (13) that fit onto the pipe. This device and method enable the in-pipe turbine to accommodate the flow of the stream without the need to construct a more expensive dam and a generator attached to the dam. This is a novel way of making an in-stream in-pipe turbine work. By not stopping the flow of water, the turbine captures both velocity and head; not just head as a dam system would. It also has an insertion system (16, 17) that fixes it easily to the nearby ground or the ground of the stream. One example is the use of a groove around the turbine that a stake of some kind can clamp around (16). There are many ways to accomplish this, but the concept of doing this with an in-pipe turbine is original. It could also be a screw that fits into some concrete or dirt, either at the bottom of the stream or at its side. A plate (17) connected to the turbine system could provide a basis for this connection. The orientation and length of the attachment device can all be variable, and there can be more than one such attachment device. One other feature of the Benkatina is the option to attach another small turbine (15) at its downstream end. This is also novel. All other instream turbines are not made with such an option.

Figure 5:
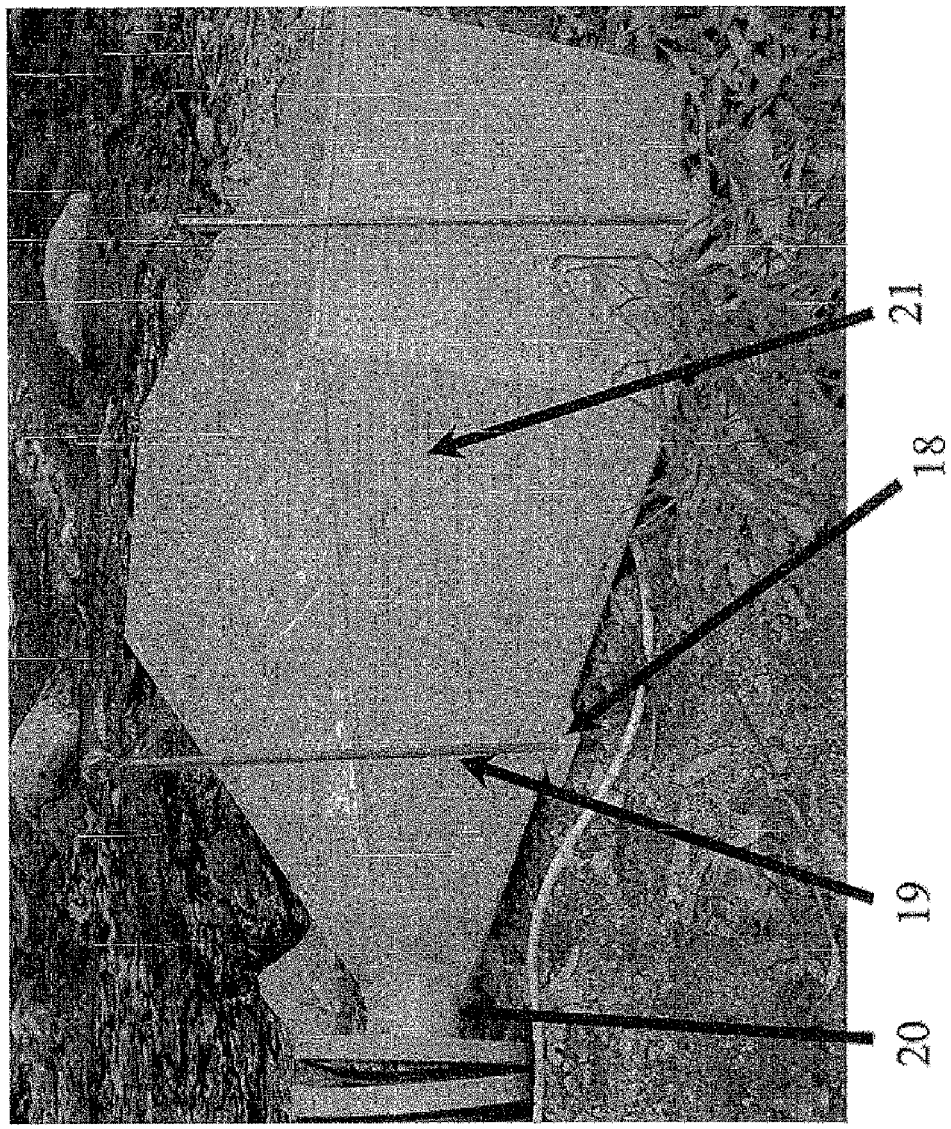
FIG. 5 is a diagram of fixation parts for a Benkatina instream turbine.

FIG. 5 is a diagram of fixation parts for a Benkatina instream turbine. The collector (21) can be used independently or can be incorporated into a dam by sealing and reinforcing the sides around it.

While the invention has been described with respect to a limited number of embodiments, it will be appreciated that many variations, modifications and other applications of the invention may be made.

SUMMARY OF THE INVENTION

The present invention successfully addresses the shortcomings of the presently known configurations by providing a solution to placing a hydroelectric turbine in flowing water systems.

It is now disclosed for the first time a floating turbine, comprising:
a. a vertical substantially fixed structure such as a pile or cable,
b. a hydroelectric turbine,
c. a connecting piece between the turbine and the structure that is operative to enable vertical motion of the turbine on the surface of the water.

In one embodiment, the system further comprises:
d. a flexible hose attached to the input of the floating turbine.

In one embodiment, the system further comprises:
e. a second turbine upstream of the floating turbine.

It is now disclosed for the first time a method of locating a floating turbine so that its outlet is always above water level.

It is now disclosed for the first time a hydroelectric system, comprising:
a. at least one floating turbine.

It is now disclosed for the first time an outfall hydroelectric system, comprising:
a. a first turbine whose point of contact with the fluid is inferior to the outfall.

In one embodiment, the system further comprises:
b. a second turbine.

In one embodiment, the system further comprises:
c. a dam downstream from the first turbine.

It is now disclosed for the first time a hydroelectric dam system, comprising:
a. a dam with an outlet turbine.
b. a vertical pipe attached to said turbine,
c. a screen or filter attached to the top of said pipe in a vertical orientation, operative to allow water only of a certain height and freedom from solids to enter the turbine.

It is now disclosed for the first time a Benkatina turbine in a stream, comprising:
a. an upstream adapter that is wider than the opening into the turbine.

In one embodiment, the system further comprises dam materials completing and/or reinforcing said adapter.

It is now disclosed for the first time an instream Benkatina turbine system, comprising:
a. means of attachment from the turbine system walls to the ground.

What is claimed is
1. A hydroelectric turbine comprising:
a support structure of a casing and a base on a surface of a body of water with a connecting enclosed inlet pipe of fixed diameter providing water from a separate body of water,
a vertical substantially fixed structure, operative to maintain the hydroelectric turbine in a substantially fixed position along a vertical line, and connected to the hydroelectric turbine,
a connecting piece between the support structure of the hydroelectric turbine and the vertical structure that is operative to enable sliding vertical motion of the hydroelectric turbine on the surface of the body of water, and
a floating means fixed to the support structure of said hydroelectric turbine.
2. The hydroelectric turbine of claim 1 wherein the inlet pipe is at least partially flexible.
3. The hydroelectric turbine of claim 1, wherein the hydroelectric turbine is near to and downstream from a dam, and located above the surface of the water downstream from the dam.
4. The hydroelectric turbine of claim 1, wherein the second body of water is an outfall, and further comprising a water wheel turbine at a level slightly inferior to the outfall and upstream of the hydroelectric turbine.

* * * * *